United States Patent [19]

Kettle, Jr. et al.

[11] Patent Number: 5,537,014
[45] Date of Patent: Jul. 16, 1996

[54] APPARATUS FOR FEEDBACK OF AN ANALOG SIGNAL USED TO MONITOR AND/OR CONTROL DYNAMIC BRAKING AND METHOD OF OPERATING

[75] Inventors: Paul J. Kettle, Jr.; Craig A. Miller; Vincent Ferri, all of Pittsburgh, Pa.

[73] Assignee: Westinghouse Air Brake Company, Wilmerding, Pa.

[21] Appl. No.: 340,232

[22] Filed: Nov. 16, 1994

[51] Int. Cl.$^6$ ................................. H02P 3/12
[52] U.S. Cl. ................................. 318/375
[58] Field of Search ................... 318/362–382

[56] References Cited

U.S. PATENT DOCUMENTS

| | | |
|---|---|---|
| 3,715,579 | 2/1973 | Eblovi . |
| 3,794,834 | 2/1974 | Auer et al. . |
| 3,805,056 | 4/1974 | Birkin . |
| 5,016,840 | 5/1991 | Bezos . |

*Primary Examiner*—David S. Martin
*Attorney, Agent, or Firm*—James Ray & Associates

[57] ABSTRACT

A locomotive throttle controller having a CPU and output driver stage. Such CPU generates an analog voltage based on software logic and transmits to the output driver stage a signal indicative such analog voltage. Such output driver stage receives the signal from such CPU and uses it to provide an analog output voltage signal to a trainline which monitors and/or controls dynamic braking. The improvement therewith of an apparatus, for feeding back from such output driver stage to the CPU an analog signal indicating status of such trainline, comprising a device for obtaining a first analog voltage signal from a node which supplies current to such trainline. A voltage-divider for dividing the first analog voltage signal into a lower range to obtain a second analog voltage signal. A signal generating device connected to receive the second analog voltage signal and generate a third analog voltage signal. A voltage to current converter receives such third analog voltage signal and provides a regulated electrical current signal on an output terminal thereof. A conduction path between such output terminal and CPU is provided. A converter in such CPU converts the electrical current signal into a fourth analog voltage signal. A comparator in such CPU compares such fourth analog voltage signal with the analog voltage based on software logic and an error signal generator in such CPU generates and utilizes an error signal indicating inconsistency between such fourth analog voltage signal and the analog voltage based on software logic.

25 Claims, 2 Drawing Sheets

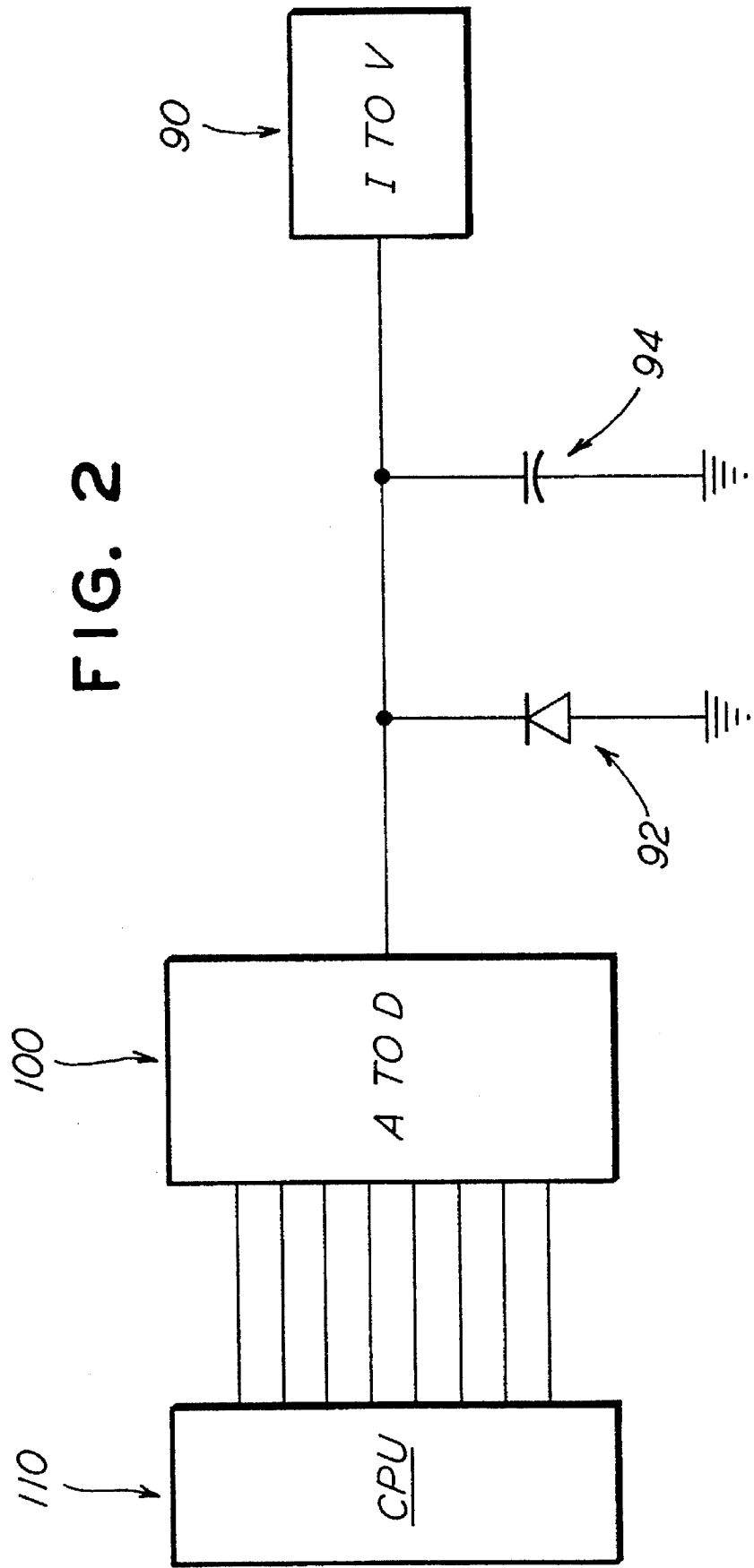

APPARATUS FOR FEEDBACK OF AN ANALOG SIGNAL USED TO MONITOR AND/OR CONTROL DYNAMIC BRAKING AND METHOD OF OPERATING

CROSS REFERENCE TO RELATED APPLICATIONS

The invention taught in this patent application is closely related to the inventions taught in the following co-pending patent applications: 08/340,525 Electronically Controlled Locomotive Throttle Controller Including Remote Multiple Unit Throttle Control; 08/340,651 Method And Apparatus For Determining And Encoding The Position Of A Reverser Handle On A Locomotive Control Stand; 08/340,235 Digital Output Control Device and Method For Operating; 08/340,239 Method And Apparatus For Feedback Of Trainline Status To The Central Processor Of A Locomotive Throttle Controller; 08/340,215 Apparatus For Interlocking Throttle, Dynamic Brake And Reverser Handles On A Control Stand Of A Railway Locomotive; 08/340,652 Method Of Performing Diagnostics On An Electronically Controlled Railway Locomotive Throttle Controller; 08/340,237 Method Of Operating A Locomotive Mounted Throttle Controller Between Two Modes Of Operation Including A Transition Between Such Two Modes; 08/340,742 An Apparatus For And A Method Of Generating An Analog Signal For Control Of Dynamic Braking; 08/340,213 An Apparatus To Enable Controlling A Throttle Controller From A Remote Host; 08/340,538 Apparatus For Interlocking Reverser Handle On A Control Stand Of A Railway Locomotive; and, 08/340,526 Apparatus For Determining The Absolute Position Of Throttle, Dynamic Brake And Reverser Handles On A Locomotive Control Stand.

Each of the above-referenced patent applications are being filed concurrently herewith and are assigned to the assignee of this invention.

Additionally, the teachings of each of these patent applications is incorporated herein by reference thereto.

FIELD OF THE INVENTION

The present invention relates, in general, to railway locomotive type throttle controllers and, more particularly, this invention relates to an electronically controlled locomotive mounted throttle controller having a central processor unit (CPU) and an output driver stage in which such CPU generates an analog voltage based on software logic and transmits to such output driver stage a signal indicative of such analog voltage for use in providing an analog output voltage signal to a trainline which monitors and/or controls dynamic braking and, still more specifically, this invention relates to an apparatus for feeding back an analog signal indicative of the status of the trainline from such output driver stage to such CPU.

BACKGROUND OF THE INVENTION

It is quite well recognized in the railway industry, prior to the present invention, that the throttle controller assemblies used in a railway type locomotive are almost exclusively of the mechanical type. These throttle controllers are for supplying signals to trainlines, which are multiple strand electrical cables which control the locomotive engine throttle setting, reverse and dynamic braking. These mechanical type locomotive throttle controller assemblies normally utilize a number of mechanical devices in order to achieve actuation of the necessary microswitches and/or contacts. It is quite well known, for example, that cams are used extensively in this application in order to achieve the required actuation of the various microswitches and/or contacts present in the mechanical type throttle controller.

Such mechanical type throttle controllers which are presently being used on railway locomotives have a number of relatively serious drawbacks and/or limitations. These limitations have become more pronounced as the length of freight trains has grown in modern railroading, because the use of more and more locomotives are now required in a train consist in order to pull and/or push the added loads being hauled. For example, these mechanical type throttle controllers utilize either microswitches or contacts to control the voltage that is being applied to the trainline. Furthermore, there is no provision in these prior art mechanical throttle controllers for possible shut down of the system in the event of an output over current.

Additionally, these mechanical type throttle controllers are not equipped to provide the operator of the locomotive with any important feedback information and, consequently, they may not recognize a potential failure situation. Throttle controllers of the mechanical type also utilize either a resistive type voltage divider or a high power potentiometer in order to control the voltage and they are not equipped for shutdown of voltage regulation.

The prior art mechanical throttle controllers normally provide labels over each of the mechanical handles to convey only the position of the handle to the locomotive operator. However, these mechanical type throttle controllers are not equipped to display certain other relevant information, such as various diagnostic information, status information and/or warning type messages.

Furthermore, in a situation where it is either desirable or necessary to provide the required throttle control from a remote host over the communication lines, the currently used mechanical type throttle controllers require that a number of additional relays be used.

It can be seen from the above discussion of the prior art mechanical type throttle controller assemblies, presently used in the railroad industry, that there is an unfilled need which exists in the modern railroad industry for an improved railway locomotive type throttle controller assembly which will provide enhanced performance capability, additional functions which are not possible to accomplish with the prior art mechanical type throttle controllers and more consistent reliability. It is evident that this need has been addressed by each of the present invention and the closely related additional inventions which are being filed concurrently herewith.

SUMMARY OF THE INVENTION

In a first aspect, this invention provides in a locomotive mounted throttle controller having a central processor unit (CPU) and an output driver stage in which such CPU generates an analog voltage based on software logic and transmits to the output driver stage a signal which is indicative of such analog voltage based on the software logic. The output driver stage receives the signal from such CPU and uses it to provide an analog output voltage signal to a trainline which controls the dynamic braking. In a system such as described above, there is provided by the instant invention an apparatus for feeding back, from the output driver stage to such CPU, an analog signal that is indicative of the status of such trainline. The feedback apparatus includes a first means for obtaining a first analog voltage signal from a circuit junction point which supplies current to the trainline. This circuit junction point is referred to as a node throughout this patent. A voltage-divider is operably connected to such first means for dividing the first analog voltage signal from such first means down into a lower range to obtain a second analog voltage signal. A second means is operatively connect to such voltage divider to accept such second analog voltage signal and for generating a third analog voltage signal. There is a voltage to current converter means connected to the second means for accepting this third analog voltage signal and using it to provide a regulated electrical current signal on an output terminal of such converter means. A conduction path is provided from such output terminal back to such CPU. A third means is provided in the CPU which receives the electrical current signal and converts it back into a fourth analog voltage signal. A fourth means disposed in the CPU is connected to receive such fourth analog voltage signal for comparing it with such analog voltage based on the software logic. The final essential element in this aspect of the invention is a fifth means disposed in such CPU for generating and utilizing an error signal indicating an inconsistency between such fourth analog voltage signal and such analog voltage based on software logic.

According to a second aspect of the present invention, in a locomotive mounted throttle controller having a CPU and an output driver stage in which such CPU generates an analog voltage based on software logic and transmits to such output driver stage the signal indicative of such analog voltage based on software logic and the output driver stage receives such signal from the CPU and uses it to provide an analog output voltage signal to a trainline which controls dynamic braking, there is provided a method for feeding back, from such output driver stage to the CPU an analog signal which is indicative of the status of said trainline. Such method includes the steps of obtaining a first analog voltage signal from a node which supplies current to such trainline and dividing such first analog voltage signal down into a lower range to obtain a second analog voltage signal. Thereafter, accepting such second analog voltage signal into a means for generating a third analog voltage signal. Then, converting the third analog voltage signal into a regulated electrical current signal and transmitting such regulated electrical current signal back to such CPU where it is converted back into a fourth analog voltage signal. Comparing in such CPU the fourth analog voltage signal with such analog voltage based on software logic. Thereafter, generating an error signal in the event of inconsistency between the fourth analog voltage signal and such analog voltage based on software logic and making such error signal available to software logic in the CPU.

OBJECTS OF THE INVENTION

It is, therefore, one of the primary objects of the present invention to provide a method of and an apparatus for providing a feedback capability to an analog system forming a part of an electronically controlled locomotive mounted throttle controller which will significantly enhance the reliability of such throttle controller.

Another object of the present invention is to provide a method of and an apparatus for providing a feedback capability to an analog system forming a part of an electronically controlled locomotive mounted throttle controller which enhance the performance of such throttle controller.

Still another object of the present invention is to provide a method of and an apparatus for providing a feedback capability to an analog system forming a part of an electronically controlled locomotive mounted throttle controller which is rather easy to implement.

Yet another object of the present invention is to provide an apparatus for providing a feedback capability to an analog system forming a part of an electronically controlled locomotive mounted throttle controller which may have incorporated therein a means for blocking an extremely high reverse voltages.

A further object of the present invention is to provide an apparatus for providing a feedback capability to an analog system forming a part of an electronically controlled locomotive mounted throttle controller which may have incorporated therein a means for protecting against relatively high-voltage spikes.

An additional object of the present invention is to provide an apparatus for providing a feedback capability to an analog system forming a part of an electronically controlled locomotive mounted throttle controller which may have incorporated therein a means for reducing transients.

In addition to the various objects and advantages of the present invention which have been discussed above it should be noted that various other objects and advantages of the method and apparatus for providing a feedback capability to an analog system forming a part of an electronically controlled locomotive mounted throttle controller will become more readily apparent to those persons skilled in the art from the following more detailed description of the invention, particularly when such description is taken in conjunction with the attached drawing Figure and with the appended claims.

BRIEF DESCRIPTION OF THE DRAWINGS

FIG. 2 is a circuit diagram according to this invention for converting the analog current signal into a digital signal in a central processor.

Figure 1:
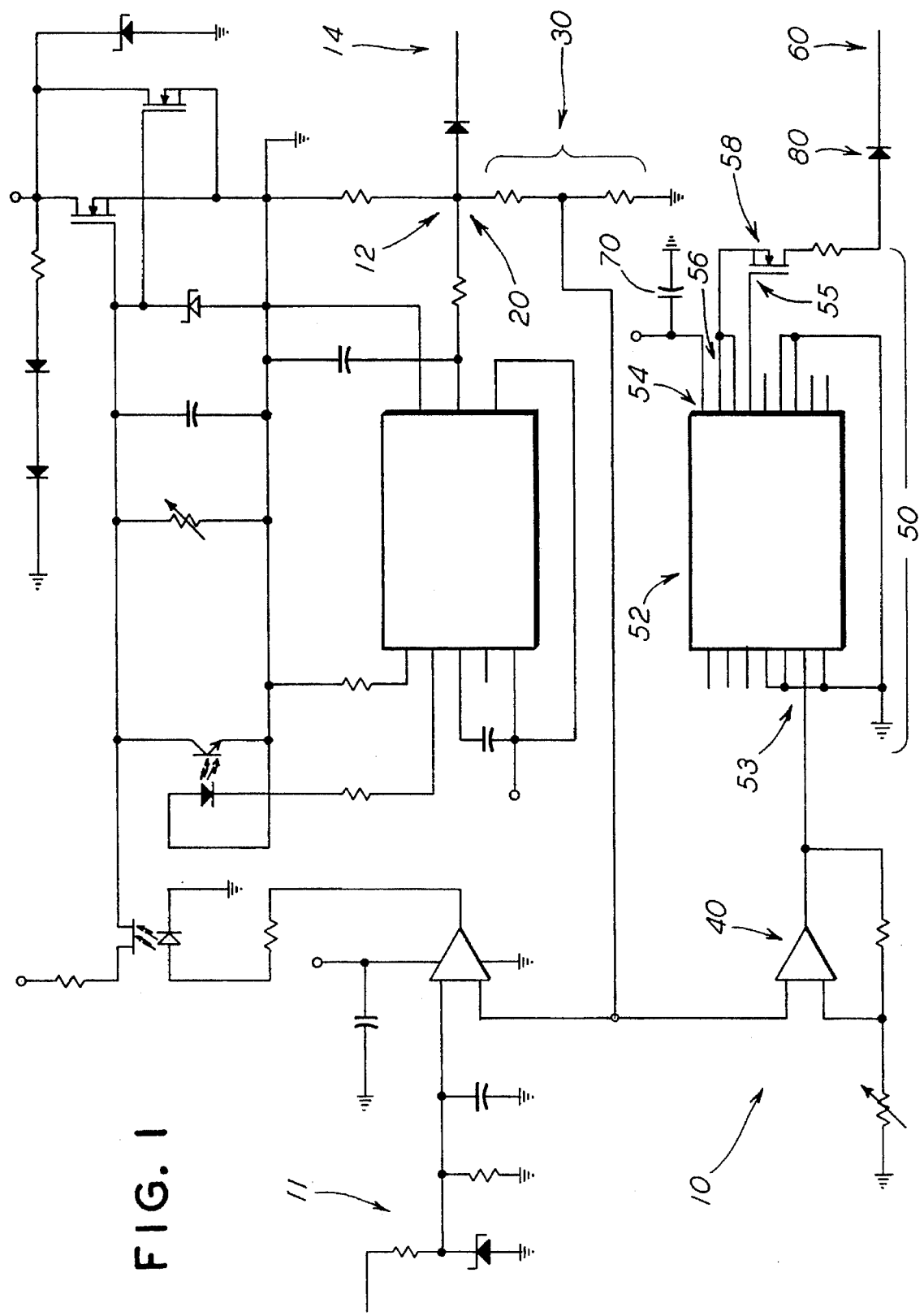
FIG. 1 is a circuit diagram according to this invention for feedback of an analog current signal.

BRIEF DESCRIPTION OF A PRESENTLY PREFERRED AND VARIOUS ALTERNATIVE EMBODIMENTS OF THE INVENTION

Now reference is made, more particularly, to the drawing. Illustrated therein is a feedback apparatus, generally designated 10, which forms a part of a locomotive throttle controller (not shown) having a central processor unit CPU 110 and an output driver stage, generally designated 11. According to this invention, the CPU uses digital information representing dynamic braking commands, applied through a digital-to-analog converter to generate an analog voltage based on software logic. Such CPU also transmits to such output driver stage a signal that is indicative of the analog voltage based on the software logic. The transmission path is indicated in FIG. 1 as element 8. The output driver stage receives such signal from the CPU and uses it to provide an analog output voltage signal to a trainline which controls dynamic braking.

The feedback apparatus 10, which feeds back from such output driver stage to the CPU an analog signal that is indicative of the status of said trainline, includes a first means, generally designated 20, disposed in such throttle controller for obtaining a first analog voltage signal from a node 12 which supplies current to the trainline 14.

A voltage-divider, generally designated 30, is connected to such first means 20 for receiving and dividing the first analog voltage signal down into a lower range in order to obtain a second analog voltage signal. There is a second means, generally designated 40, connected to such voltage-divider 30 for accepting the second analog voltage signal. Such second means 40 generates a third analog voltage signal. Such second means 40 may be, for example, an operational amplifier which accepts the second analog voltage signal and generates such third analog voltage signal. The instantaneous value of such third analog voltage signal equals the instantaneous value of the second analog voltage signal multiplied by a constant. Such second means 40 may also be a passive conduction path, such that such third analog voltage signal is substantially equal to such second analog voltage signal.

A voltage to current converter ensemble, generally designated 50, is connected to receive such third analog voltage signal from the second means 40. The voltage to current converter ensemble 50 uses this third analog voltage signal to provide a regulated electrical current signal on an output terminal of such converter ensemble 50. A conduction path 60 is connected from the output terminal back to a microprocessor, generally designated 15, which includes CPU 110.

In the presently preferred embodiment of the invention, such voltage to current converter ensemble 50 includes an integrated circuit 52 and an external pass element 58. Pass element 58 is a circuit element having an impedance which depends on a voltage signal. Pass element 58, in the preferred embodiment, is a field effect transistor.

Such integrated circuit 52 and pass element 58 cooperate as follows: such integrated circuit 52 accepts such third analog voltage signal at voltage inputs 53, and also accepts a D.C. voltage on a power input terminal 54. The integrated circuit 52 has an internal resistor (not shown) disposed between such power input terminal and a current output terminal 56. A voltage drop across the internal resistor is obtained by such integrated circuit 52, which compares it with the voltage at the voltage inputs 53 to obtain a voltage error signal which is supplied to the input 55 of such pass element 58 thereby adjusting its impedance. Further, the integrated circuit 52 supplies an output current signal at such current output terminal 56. This output current signal is passed through the conduction side of such pass element 58, which regulates such output current based on the voltage error signal supplied to the input of such pass element 58, to provide a regulated output current signal based on said third analog voltage signal.

There is a third means, generally designated 90, disposed in microprocessor 15 that is connected to receive the electrical current signal for converting such electrical current signal back into a fourth analog voltage signal.

Also, disposed in microprocessor 15 is a fourth means, generally designated 100, which is connected to receive such fourth analog voltage signal and for converting this, through an analog-to-digital converter into digital information for comparing with the digital information representing dynamic braking, which originated in the CPU.

In the preferred embodiment the D.C. voltage on such power input terminal includes a means, generally designated 70, for reducing transients. Preferably, the means 70 is a capacitor connecting such power input terminal to a ground. Additionally, the apparatus 10 further includes a diode 80 disposed between such output terminal of the voltage to current converter ensemble 50 and such conduction path 60. The diode 80 provides desirable protection from reverse voltage transients and blocks extremely high reverse voltages.

In addition the microprocessor 15 will, preferably, include a means for protecting such fourth analog voltage signal from high-voltage spikes. Preferably, such means disposed in microprocessor 15 for protecting such fourth analog voltage signal from extremely high-voltage spikes comprises a diode 92 which normally does not conduct, but which conducts if the voltage across it exceeds a known value. The fourth analog voltage signal being applied to one terminal of such diode, and the other terminal of such diode being connected to a ground.

Microprocessor 15, preferably, further includes a means for protecting the fourth analog voltage signal from transients. Such means for protecting the fourth analog voltage signal from transients is, preferably, a capacitor 94. The analog voltage signal being applied to one terminal of such capacitor and the other terminal of such capacitor being connected to a ground.

To assist a person skilled in the art to use the invention, the following descriptors are presented for components in the circuits of the presently most-preferred embodiment.

The operational amplifier 40 is an LT1013. Integrated circuit 52 is an XTR112. The pass element 58 is an IRF9513. The diode 80 to the analog feedback line is a 1N4007.

The following values for various resistors were found to be appropriate. R11=49.9K Ohms. R12=2.49K Ohms. R13=10K Ohms. R14=4.02K Ohms. R15=100 Ohms.

In a second aspect of the present invention there is taught a method for feeding back, from an output driver stage to a central processor unit an analog signal indicative of the status of the trainline connected to a locomotive throttle controller having such central processor unit and such output driver stage such central processor unit generates an analog voltage based on software logic. The central processor unit transmitting to such output driver stage a signal indicative of the analog voltage based on software logic. The output driver stage receiving such signal from such central processor unit and using it to provide an analog output voltage signal to the trainline which controls dynamic braking.

According to the presently preferred embodiment of the invention the method includes the steps of obtaining a first analog voltage signal from a node which supplies current to such trainline and dividing such first analog voltage signal obtained down into a lower range to obtain a second analog voltage signal.

A third analog voltage signal is generated from such second analog voltage signal. This third analog voltage signal is then converted into a regulated electrical current signal. This regulated electrical current signal is then transmitted back to such microprocessor where it is then converted back into a fourth analog voltage signal and, in such microprocessor, this fourth analog voltage signal is compared with such analog voltage based on software logic. An error signal is then generated in the event of an inconsistency between such fourth analog voltage signal and such analog voltage based on software logic. This error signal is then made available to the software logic in such microprocessor.

According to the preferred method, the dividing of such first analog voltage signal into a lower range is accomplished by attaching to such node a resistive path to ground. Such path to ground including at least two resistors in series. Such second analog voltage signal being obtained from a node joining at least two resistors disposed in series. Additionally, such third analog voltage signal is obtained from such second analog voltage signal by means of an operational amplifier.

Converting of such third analog voltage signal into a regulated electrical current signal is accomplished by using an ensemble comprising an integrated circuit and an external pass element and includes the steps of applying such third analog voltage signal to a voltage input of such integrated circuit and applying a DC voltage to a power input terminal of the integrated circuit. An output current is taken from a current output terminal of such integrated circuit. Preferably, such current output terminal being connected internally in such integrated circuit through a resistor to the power input terminal. A gate signal is obtained from such integrated circuit. The gate signal being obtained internally in this integrated circuit by comparing the voltage drop across the resistor and the voltage on such voltage input and applying such gate signal to the input of an external pass element which is, preferably, a field-effect transistor. Thereafter, obtaining a current from such current output terminal and passing it through the pass side of such external pass element so that the output current is regulated in accordance with such gate signal to provide an analog current output signal characteristic of such third analog voltage signal.

The presently preferred method further includes the step of removing transient voltages from the DC voltage on such power input terminal by connecting the power input terminal to a ground through a capacitor. In addition, the preferred method includes the further steps of providing protection from reverse voltage transients by passing such regulated electrical current signal through a diode capable of blocking extremely high reverse voltages and protecting such fourth analog voltage signal from high-voltage spikes. The step of protecting such fourth analog voltage signal from high-voltage spikes is achieved through the use of a diode which normally does not conduct, but which will conduct when the voltage across it exceeds a predetermined known value. Such fourth analog voltage signal being attached to one terminal of such diode and the other terminal being connected to a ground.

Similarly, the method includes the further step of protecting such fourth analog voltage signal from transient voltages through the use of a capacitor. This fourth analog voltage signal being attached to one terminal of such capacitor and the other terminal being connected to a ground.

Finally, in the presently preferred method, such error signal is made available to the software logic by applying such fourth analog voltage signal to an analog to digital converter and the digital signal thereby obtained being attached to the logic section of said microprocessor.

While a presently preferred and a number of alternative embodiments of the present invention have been described in detail above with reference to the drawing, it should be understood that various other adaptations and modifications to the apparatus for feedback of an analog signal used to control dynamic braking and method of operating can be made by those persons who are skilled in the railway electronics art without departing from the spirit or scope of the appended claims.

We claim:

1. In a locomotive throttle controller having a central processor unit and an output driver stage, said central processor unit generating an analog voltage based on software logic, said central processor unit transmitting to said output driver stage, a signal indicative of said analog voltage based on software logic; said output driver stage receiving said signal from said central processor unit and using it to provide an analog output voltage signal to a trainline which provides for controlling dynamic braking, wherein the improvement comprises apparatus for feeding back, from said output driver stage to said central processor, an analog signal indicative of the status of said trainline; said apparatus comprising:

(a) a first means disposed in such throttle controller for obtaining a first analog voltage signal from a node which supplies current to said trainline;

(b) a voltage-divider connected to said first means for receiving and dividing said first analog voltage signal down into a lower range to obtain a second analog voltage signal;

(c) a second means connected to said voltage divider for accepting said second analog voltage signal and generating a third analog voltage signal, said third analog voltage signal being indicative of said second analog voltage signal;

(d) a voltage to current converter ensemble connected to receive said third analog voltage signal and use it to provide a regulated electrical current signal on an output terminal of said converter ensemble;

(e) a conduction path connected from said output terminal back to said microprocessor;

(f) a third means disposed in said microprocessor connected to receive said electrical current signal for converting said electrical current signal back into a fourth analog voltage signal;

(g) a fourth means disposed in said microprocessor connected to receive said fourth analog voltage signal for comparing said fourth analog voltage signal with said analog voltage based on software logic; and (h) a fifth means disposed in said microprocessor connected to receive said fourth analog voltage signal for generating and utilizing in such software logic an error signal indicating inconsistency between said fourth analog voltage signal and said analog voltage based on software logic.

2. The locomotive throttle controller, according to claim 1, wherein said second means is an operational amplifier which accepts said second analog voltage signal and generates said third analog voltage signal, the instantaneous value of said third analog voltage signal equaling the instantaneous value of said second analog voltage signal multiplied by a constant.

3. The locomotive throttle controller, according to claim 1, wherein said second means is a passive conduction path, such that said third analog voltage signal is substantially equal to said second analog voltage signal.

4. The locomotive throttle controller, according to claim 1, wherein said V to I converter ensemble comprises an integrated circuit and an external pass element.

5. The locomotive throttle controller, according to claim 4, wherein said integrated circuit and pass element cooperate as follows:

(a) said integrated circuit accepts said third analog voltage signal at a voltage input, and also accepts a D.C. voltage on a power input terminal;

(b) said integrated circuit has an internal resistor disposed between said power input terminal and a current output terminal;

(c) said integrated circuit obtains the voltage drop across said internal resistor and compares it with the voltage at said voltage input to obtain a voltage error signal which is supplied to the input of said pass element thereby adjusting its impedance;

(d) said integrated circuit supplies an output current signal at said current output terminal; and (e) said output current signal is passed through the conduction side of said pass element, which regulates said output current based on said voltage error signal supplied to said input of said pass element, to provide a regulated output current signal based on said third analog voltage signal.

6. The locomotive throttle controller, according to claim 4, wherein said pass element is a field-effect transistor.

7. The locomotive throttle controller, according to claim 5, wherein the D.C. voltage on said power input terminal has means for reducing transients, said means comprising a capacitor connecting said power input terminal to a ground.

8. The locomotive throttle controller, according to claim 1, further comprising a diode disposed between said output terminal of said V to I converter ensemble and said conduction path; said diode providing protection from reverse voltage transients; said diode being characterized as blocking extremely high reverse voltages.

9. The locomotive throttle controller, according to claim 1, further comprising means for protecting said fourth analog voltage signal from high-voltage spikes.

10. The locomotive throttle controller, according to claim 9, wherein said means for protecting said fourth analog voltage signal from high-voltage spikes comprises a diode which normally does not conduct, but which conducts if the voltage across it exceeds a known value; said fourth analog voltage signal being applied to one terminal of said diode, and the other terminal of said diode being connected to a ground.

11. The locomotive throttle controller, according to claim 1, further comprising means for protecting said fourth analog voltage signal from transients.

12. The locomotive throttle controller, according to claim 11, wherein said means for protecting said fourth analog voltage signal from transients is a capacitor, said analog voltage signal being applied to one terminal of said capacitor, and the other terminal of said capacitor being connected to a ground.

13. In a locomotive throttle controller having a central processor unit and an output driver stage, said central processor unit generating an analog voltage based on software logic, said central processor unit transmitting to said output driver stage, a signal indicative of said analog voltage based on software logic, said output driver stage receiving said signal from said central processor unit, and using it to provide an analog output voltage signal to a trainline which provides for controlling dynamic braking, a novel method for feeding back, from said output driver stage to said central processor, an analog signal indicative of the status of said trainline; said method comprising the following steps:

(a) obtaining a first analog voltage signal from a node which supplies current to said trainline;

(b) dividing said first analog voltage signal, from Step (a) down into a lower range to obtain a second analog voltage signal;

(c) accepting said second analog voltage signal and generating a third analog voltage signal;

(d) converting said third analog voltage signal into a regulated electrical current signal;

(e) transmitting said regulated electrical current signal back to said microprocessor;

(f) in said microprocessor, converting said regulated electrical current signal back into a fourth analog voltage signal;

(g) in said microprocessor, comparing said fourth analog voltage signal with said analog voltage based on software logic;

(h) generating an error signal in the event of inconsistency between said fourth analog voltage signal and said analog voltage based on software logic; and (i) making said error signal available to software logic in said microprocessor.

14. The method, according to claim 13, wherein step (b) is accomplished by attaching to said node a resistive path to ground, said path comprising at least two resistors in series, said second analog voltage signal being obtained from a node joining at least two resistors disposed in series.

15. The method, according to claim 13, wherein Step (c) comprises obtaining said third analog voltage signal from said second analog voltage signal by means of an operational amplifier.

16. The method, according to claim 13, wherein Step (d) is accomplished by using an ensemble comprising an integrated circuit and an external pass element.

17. The method, according to claim 13, wherein Step (d) is further characterized as comprising the steps of:

(a) applying said third analog voltage signal to a voltage input of an integrated circuit;

(b) applying a DC voltage to a power input terminal of said integrated circuit;

(c) taking an output current from a current output terminal of said integrated circuit, said current output terminal being connected internally in said integrated circuit through a resistor to said power input terminal;

(d) obtaining a gate signal from said integrated circuit, said gate signal being obtained internally in said integrated circuit by comparing the voltage drop across said resistor and the voltage on said voltage input, and applying said gate signal to the input of an external pass element; and (e) obtaining a current from said current output terminal and passing it through the pass side of said external pass element so that the output current is regulated in accordance with said gate signal to provide an analog current output signal characteristic of said third analog voltage signal.

18. The method, according to claim 16, wherein said external pass element is a field-effect transistor.

19. The method, according to claim 17, further comprising the step of removing transient voltages from said DC voltage on said power input terminal by connecting said power input terminal to a ground through a capacitor.

20. The method, according to claim 13, further comprising the step of providing protection from reverse voltage transients by passing said regulated electrical current signal through a diode; said diode being characterized as blocking extremely high reverse voltages.

21. The method, according to claim 13, further comprising the step of protecting said fourth analog voltage signal from high-voltage spikes.

22. The method, according to claim 21, wherein said step of protecting said fourth analog voltage signal from high-voltage spikes comprises the use of a diode which normally does not conduct, but which conducts when the voltage across it exceeds a known value, said fourth analog voltage signal being attached to one terminal of said diode, and the other terminal being connected to a ground.

23. The method, according to claim 13, further comprising the step of protecting said fourth analog voltage signal from transient voltages.

24. The method, according to claim 23, wherein said step of protecting said fourth analog voltage signal from transient voltages comprises the use of a capacitor, said fourth analog voltage signal being attached to one terminal of said capacitor, and the other terminal being connected to a ground.

25. The method, according to claim 13, wherein Step (i) comprises applying said fourth analog voltage signal to an analog to digital converter, the digital signal thereby obtained being attached to the logic section of said microprocessor.

* * * * *

UNITED STATES PATENT AND TRADEMARK OFFICE
CERTIFICATE OF CORRECTION

PATENT NO. : 5,537,014
DATED : July 16, 1996
INVENTOR(S) : Paul J. Kettle, Jr. et al.

It is certified that error appears in the above-indentified patent and that said Letters Patent is hereby corrected as shown below:

Column 3, line 8, delete "connect" and insert --connected--.

Column 4, line 33, delete "Figure" and insert --Figures--;

Column 4, line 49, delete "drawing" and insert --drawings--;

Column 7, line 54, delete "drawing" and insert --drawings--.

Signed and Sealed this

Twenty-seventh Day of January, 1998

Attest:

BRUCE LEHMAN

*Attesting Officer*  *Commissioner of Patents and Trademarks*